UNITED STATES PATENT OFFICE 2,305,829

METHOD FOR RECOVERING ZINC AND IRON OXIDE FROM FILTER DUST

Heinrich Pieper, Hattingen, Germany; vested in the Alien Property Custodian

No Drawing. Application January 16, 1939, Serial No. 251,278. In Germany February 26, 1938

1 Claim. (Cl. 75—111)

This invention relates to a method for the recovering of zinc and iron oxide residues from filter dust, especially from the dust from blast furnace gas purification or from wastes from galvanizing shops or the like.

When for example 25,000 tons of pig iron is smelted per month and ordinary mixture compositions of ores not particularly rich in zinc is used, about 250 tons of filter dust is obtained per month in the blast furnace installation. This dust has on an average the following percentages of valuable metal compounds:

$ZnO = 20$ to $30\%$
$PbO = 3$ to $6\%$
$Fe_2O_3 = 20$ to $40\%$
$MnO = 2$ to $4\%$

The fineness of grain and the pyrophoric properties of this dust make of it a troublesome by-product at the best suitable as gob. The removal of the waste acids containing iron chloride, chloride or sulphate produced in the galvanizing shops often presents great difficulties.

The object of the invention is to find for these two products a profitable use and especially to utilize their contents in zinc and iron.

This is attained according to the invention in a simple manner in that some of the constituents of the dust are brought into a water-soluble state by a conversion process with the aid of waste acids. Both, the mordant liquors containing iron chloride and also those containing sulphate enable a chlorination or sulphatizing of those dust components whose chlorides or sulphates are more stable than those of iron at increase in temperature. Subsequent water extraction enables a convenient separation of the water-soluble component from the insoluble residue. The high percentage of iron in the mordant liquor also results in an additional increase of the iron oxide content in the residue.

The conversions take place chiefly according to the following equations:

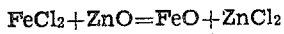

and

or

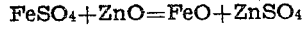

and

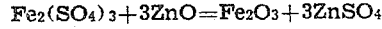

it being possible by changing the quantities of mordant liquor to separate different quantities of zinc. If the waste acid is not available in sufficient quantity, a saturated solution of filter dust or similar dusts in hydrochloric acid is for example prepared (for example 1 part by weight water + 3 parts by weight, 1,19 hydrochloric acid).

This solution is saturated in a very short time owing to the great fineness of the dust. It is weakly acid and, when using filter dust and hydrochloric acid, contains a very large quantity of zinc-iron and manganese chloride. When such a solution is used only the quantities of chlorine and sulphate which are not bound on zinc, earth alkalis or alkalis are available for the chlorination or sulphatisation. The quantities of acid to be added to the dust may be adapted to the quantities of zinc to be extracted according to the above equations. As the phases during the reaction are mainly liquid-stable and gaseous-stable only to a minor extent, this conversion process is possible at relatively low temperature especially when chloride liquors are used.

The method is carried out in the following manner when chloride liquors are used:

A stiff paste is formed from the filter dust and the corresponding quantities of weakly-acid waste acid or synthetic chloride solution (filter dust + technical hydrochloric acid) according to the purpose of use, that is either for the purpose of attaining as complete a separation of zinc as possible and obtaining a residue rich in iron oxide or of attaining a partial separation of zinc and a residue still containing zinc oxide and rich in iron oxide. This paste is heated to about 350° C. for 1 to 2 hours, if desired with addition of steam during which heating neither iron chloride nor zinc chloride pass off. At the end of this period air is passed through the reaction furnace for a short time at about 300 to 450° C. with the result that the material is thus completely dried and the last traces of iron chloride are decomposed. The steam treatment may also be dispensed with.

The oxide chloride mixture thus obtained is ground and extracted free of chloride with water. In the iron-free water extract zinc chloride is the main constituent with small quantities of lead, manganese and alkali chlorides. The solution obtained may be electrolyzed for the production of zinc or zinc compounds can be produced therefrom by a chemical process.

According to how the method is carried out the residue contains varying quantities of zinc and lead oxide; it is always rich in iron oxide and after suitable further treatment is suitable for the the production of anti-rust paints on iron, zinc and lead oxide basis. It may also be used for coloring cement. If desired, it may be briquetted and made ready for smelting. On an average the residue amounts to 60% of the above product from chlorination.

The coloring substance made from the residues and which contains large quantities of precipitated, non-crystalline iron oxide, dries and adheres very well on wood, glass and metals.

| Values obtained | Fe₂O₃ | MnO | PbO | ZnO |
|---|---|---|---|---|
| Analysis of the untreated dust A | 15.96 | 2.56 | 6.15 | 25.68 |
| Analysis of the residue after treatment with a quantity of acid whose chlorine content is equivalent to a content of 25% zinc in the dust, is: | | | | |
|   Residue dried | 45.35 | 2.94 | 6.35 | 16.91 |
|   Residue glowed at 600° C | 47.48 | 3.10 | 5.12 | 16.02 |
| Analysis of the untreated dust B | 23.74 | (¹) | 3.04 | 25.78 |
| Analysis of the residue after treatment with a quantity of acid whose chlorine content is equivalent to a content of 50% zinc in the dust, is: residue dried | 65.51 | (¹) | 2.00 | 2.95 |

¹ Not ascertable.
The last value would mean an extraction of about 90% of the existing zinc.

I claim:

The process of recovering zinc and residual products including iron oxide from filter dust derived from blast furnace gas purification, which comprises mixing such a filter dust with a weakly-acid waste iron chloride liquor, of the type obtained from galvanizing shops, to form a paste, heating the paste at atmospheric pressures to a temperature of about 350° C. for a period of about 1 to 2 hours, then heating at temperatures within the range of about 300° to 450° C. while passing air through the reaction zone to complete the decomposition of the iron chloride, grinding the resulting mixture of iron oxide and zinc chloride and extracting the zinc chloride with water.

HEINRICH PIEPER.